Jan. 20, 1931.   O. F. SHEPARD   1,789,417
POLYPHASE MAGNET
Filed Oct. 26, 1926   2 Sheets-Sheet 1
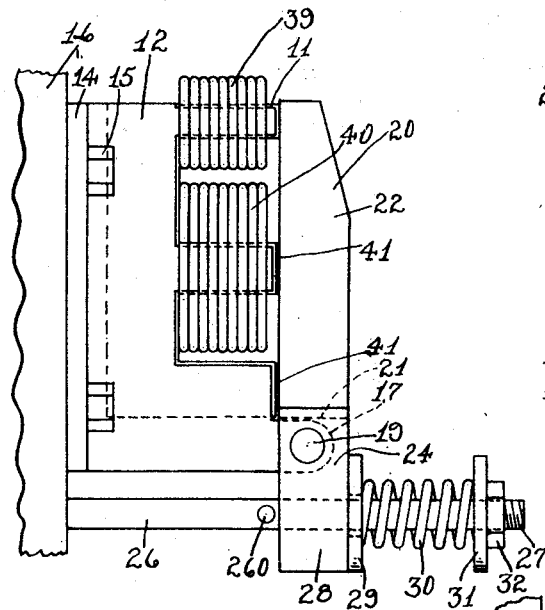
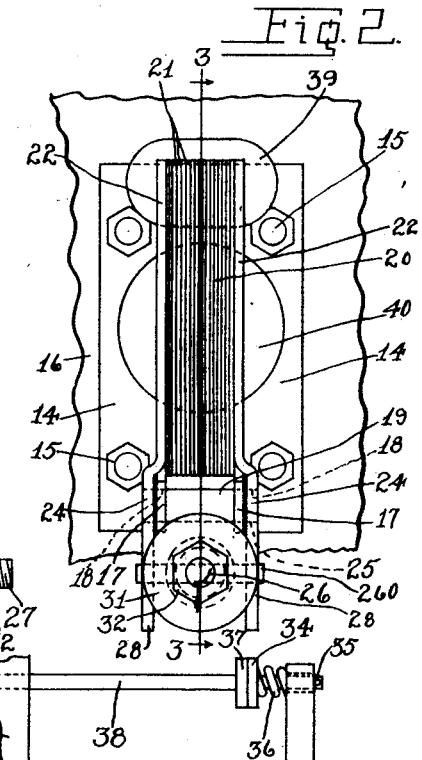
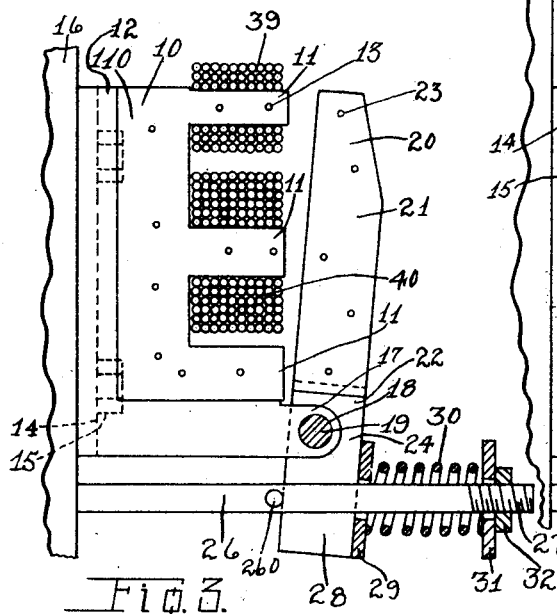
Inventor
OSCAR F. SHEPARD
By Murray & Burgelter
Attorneys Inventor
OSCAR F. SHEPARD.

Patented Jan. 20, 1931

1,789,417

UNITED STATES PATENT OFFICE

OSCAR F. SHEPARD, OF CINCINNATI, OHIO

POLYPHASE MAGNET

Application filed October 26, 1926. Serial No. 144,257.

The present application is a continuation in part of my prior application for United States Letters Patent, Serial 686,431 filed June 15, 1924.

This application relates to improvements in a polyphase or split phase magnet.

An object of the invention is to provide a polyphase magnet that is silent in operation and which eliminates the chatter frequently associated with polyphase magnets.

Another object of the invention is to provide a polyphase magnet for alternating current wherein the continuous slap of the armature against the magnet during the oscillation of the alternating current is eliminated.

Another object of the invention is to provide a device of this type that is simple of construction and economical to manufacture to accomplish the above objects.

Another object of the invention is to provide a polyphase magnet wherein there is no metal to metal magnetic circuit and wherein the residual magnetism is reduced to a minimum.

These and other objects are attained by the means described herein and disclosed in the accompanying drawings; in which:

Fig. 1 is a side elevation of the improved electromagnet.

Fig. 2 is a front elevation of the device shown in Fig. 1.

Fig. 3 is a sectional view taken on line 3—3 of Fig. 2.

Fig. 4 is a side elevation of a modified form of the electromagnet as used to operate an electric switch.

Figure 5:
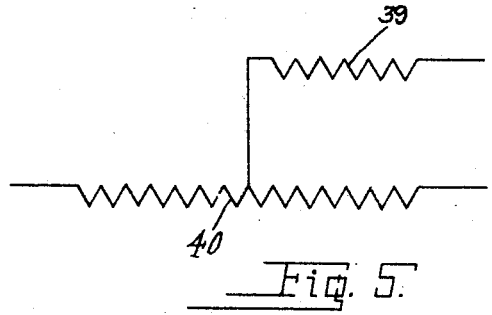
Figs. 5, 6, 7 and 8 show various methods by which the coils of the electromagnets, forming details of this invention may be wired.

The improved magnet comprises a plurality of core plates 10 having a plurality of projections 11 extending from a suitable yoke 110.

The core plates 10 are secured between suitable side plates 12 by the usual rivets 13 or the like. The core plates 10 are substantially E shaped as shown in Fig. 3. Each of the side plates is provided with a flange 14 through which suitable fastening means such as bolts 15 pass for securing the magnet to a suitable support 16.

The side plates 12 are provided at their lower ends with suitable outwardly extending lugs 17 having aligned perforations 18 formed therein through which a suitable pin 19 extends. An armature 20 comprising the usual laminations 21 is provided, having the laminations 21 secured between side plates 22 by means of rivets 23 or the like. The lower ends of the side plates 22 are provided with arms 24 whereby a suitable clevis is formed in which is received the lugs 17 formed on the magnet side plates 12. The clevis arms 24 are provided with perforations 25 in alignment with the perforations 18 formed in the lugs 17 and through which perforations 25 the pin 19 extends. The clevis arms 24 lugs 17 and pin 19 form a pivotal mounting for the armature 20.

Any suitable knock out means may be employed for breaking the contact between the magnet and the armature when the magnet has been demagnetized. The means disclosed in the drawings is a common means usually employed with electric brakes and comprises a stud or shaft 26 extending from the support 16 and having its free end 27 provided with threads. The clevis arms 24 are provided with extensions 28 intermediate which the shaft 26 extends. A collar or washer 29 is mounted on the shaft 26 and contacts the extensions 28, which collar 29 forms one abutment for a suitable coil spring or the like 30. The spring 30 has its other end in abutment on a second collar or washer 31. A suitable adjusting nut 32 is mounted on the threaded end 27 of the shaft and limits the outward movement of the expansion or coil spring 30. The shaft 26 is provided with a suitable stop pin 260 against which the clevis arms 24 strike for limiting the throw or outward movement of the armature 20.

The device disclosed in Fig. 4 is similar to the devices disclosed in Figs. 1, 2 and 3 except that this device is used for operating a suitable switch. The device disclosed in Fig. 4 comprises an armature 20 pivoted at 19 and carrying a suitable switch arm 33. The upper end of the switch arm 33 carries a yieldably mounted contact 34 having a stem 35 which stem 35 extends through the switch arm 33. A suitable coil spring 36 is provided having its opposite end in abutment upon the contact 34 and the switch arm 33 to cushion the impact of the contacts 34 and 37 when they are brought into operative engagement. The coil or expansion spring 36 co-operates with the knock out means to break the engagement between the contacts 34 and 37. The second contact 37 is carried by a suitable arm 38 which is fixedly mounted either to the support 16 or any other suitable support.

Figure 6:
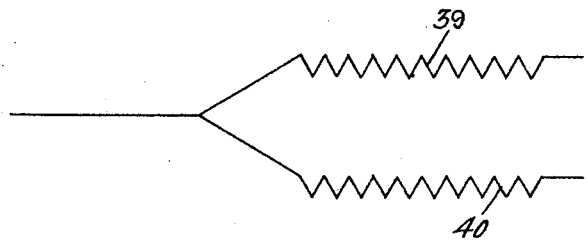
Figure 7:
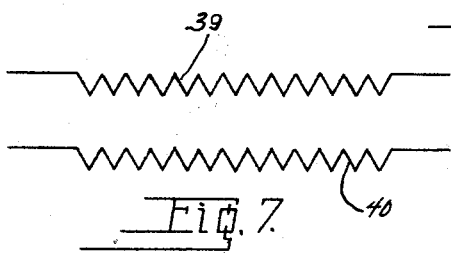
Figure 8:
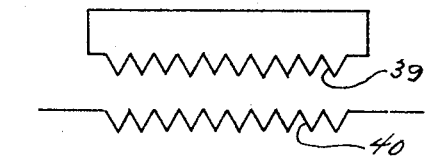

Suitable coils 39 and 40 are mounted about the projections or poles 11 of the magnet core plates 10. It should be noted that the area or cross section of the projections or poles farthest from the pin 19 are inversely proportioned to the distance the said projections are from the pivot point. This is possible because of the increased leverage obtained upon the armature the farther from the pivot point a force is exerted. It should be noted that the armature 20 contacts the projection 11 farthest from the pivot point and that the remaining projections or poles are slightly shorter than the contacting projection or pole whereby an air space 41 is provided intermediate the armature and the remaining projections. With this structure there is no metal to metal magnetic circuit. It must therefore follow that the residual magnetism, usually found in electromagnets, is reduced to an absolute minimum, since this residual magnetism cannot be absolutely eliminated. It is also evident that with this structure the chatter or continuous slap, usually found in polyphase or split phase magnets due to the oscillation of alternating currents, is eliminated because the armature is held against but one pole instead of against two or more poles as is the general practise. To obtain a different phase current at each pole, the coils may be wired as shown in either of the Figs. 5, 6, 7 and 8.

What is claimed is,

1. A polyphase electromagnet comprising a plurality of E shaped core plates, side plates joined to the core plates and forming the core of the electromagnet, an armature comprising core plates and side plates secured to the core plates, lugs formed on the core side plates having aligned perforations formed therein, a clevis formed on the armature side plates having aligned perforations formed therein in alignment with the perforations in the core side plates, a pin extending through the aligned perforations and forming a pivotal mounting for the armature, and yielding throw out means for operating the armature against the attraction of the armature magnet.

2. A polyphase magnet comprising a substantially E-shaped core providing an upper pole, an intermediate pole, and a lower pole, the first mentioned pole being extended, coils on the upper and intermediate poles, an armature pivoted adjacent the lower pole and movable on its pivotal mounting to contact with the upper pole only and knockout means operative to separate the armature from said pole when the coils are de-energized.

3. An alternating current electromagnet comprising a core having a plurality of aligned poles, an armature pivoted for movement in a plane with said poles and movable to contact with at least one of the poles and having an interrupted metallic continuity for magnetic lines of force through said poles, and coils carried by at least two of the poles.

4. An alternating current electromagnet structure comprising a substantially E-shaped core providing aligned poles, an armature pivoted for movement in the plane of said core, the pivotal mounting being adjacent the endmost pole, coils on the poles other than said endmost pole, the armature and poles being arranged so that the armature may abut at least one of said poles and have uninterrupted magnetic continuity with the core through only one of said poles, and coils on the poles non-adjacent the pivotal mounting of the armature.

5. A magnet comprising a substantially E-shaped core, an upper pole, an intermediate pole, and a lower pole, the first mentioned pole being extended, an armature pivoted adjacent the lower pole and movable on its pivot to contact the upper pole only, and coils on the upper and intermediate pole to jointly energize the core.

6. An alternating current magnet comprising a core having at least 3 aligned poles, an armature pivotally mounted adjacent an endmost pole of said core, the pole at the other end of the core being extended, the poles remote from the armature mounting being of relative cross sectional areas inversely proportional to the respective distances from the pivotal armature mounting, and coils mounted on the poles non-adjacent to said pivotal armature mounting.

7. A nonchattering alternating current electromagnet comprising a substantially E-shaped core, providing poles, an armature pivoted adjacent an end of the core and movable in a plane therewith, coils on the poles for attracting the armature thereto, the armature having abutment with but one projecting part of the core against which it may be held firmly, the magnetic lines of force set up by the electromagnet having an interrupted circuit through an interposed reluctance and the core and armature.

In testimony whereof I have hereunto subscribed my name this 19th day of October, 1926.

OSCAR F. SHEPARD.